Nov. 8, 1960     W. S. MARX, JR     2,959,484
METHOD FOR PREPARING ART COPY FOR RELIEF OR OFFSET PRINTING
Filed March 15, 1957
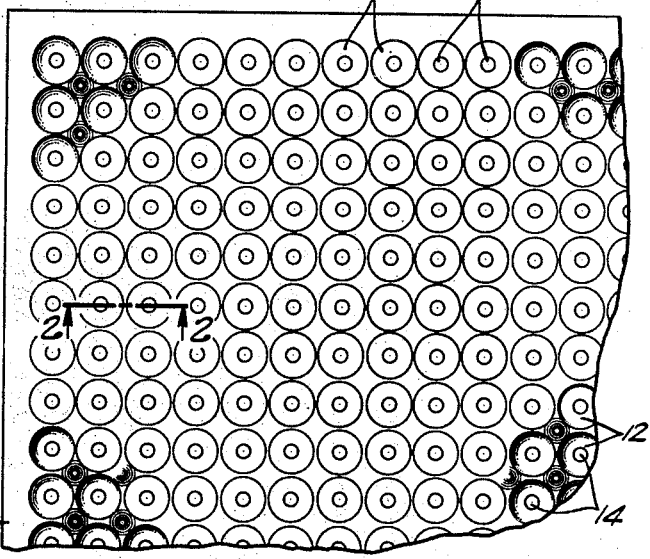
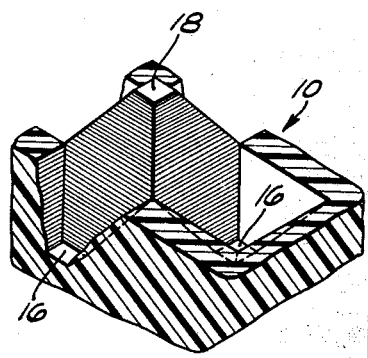
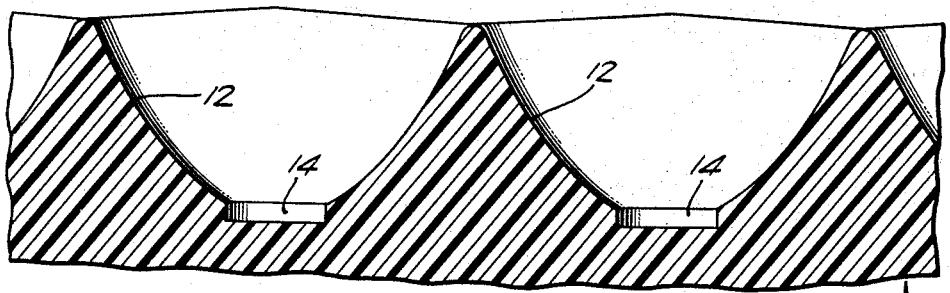
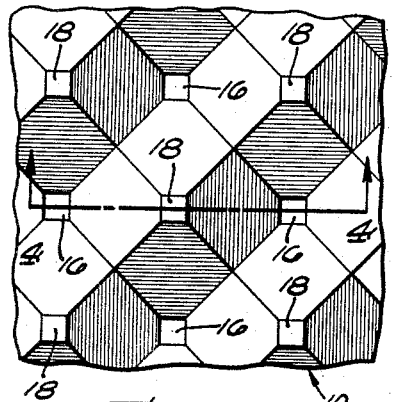
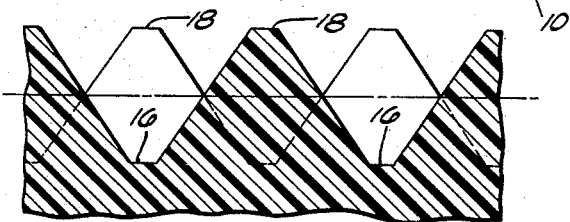
WALTER S. MARX, JR.
INVENTOR.
BY
ATTORNEYS.

2,959,484

METHOD FOR PREPARING ART COPY FOR RELIEF OR OFFSET PRINTING

Walter S. Marx, Jr., La Arcada Bldg., Santa Barbara, Calif.

Filed Mar. 15, 1957, Ser. No. 646,467

5 Claims. (Cl. 96—45)

This invention relates to an improved method for preparing art copy and negatives for printed reproduction.

It is an object of this invention to provide a novel method for producing a negative from which a printing plate is prepared, suitable for producing advertising or illustrative material and the like in printed publications. In the past, such negatives have been prepared by photographing through a halftone screen or by application of the required dots on special paper. This method provides a new approach to the creation of halftone dots or screen pattern required for offset or relief printing.

It is a further object of this invention to provide a method which is readily adapted to color and color combination printing, eliminating the expense and difficulty involved in the presently utilized methods, as well as eliminating much corrective work and risk of error.

It is a further object of this invention to provide a reliable preview of the completed halftone color illustration prior to printing, to eliminate any error, which preview was, in many instances, impractical under present systems.

It is still a further object of this invention to provide a method simpler and faster for printing illustrations which combine halftone and type or halftone and line, eliminating a great deal of the work currently necessary in assembling such material.

It is still a further object of this invention to facilitate the printing of illustrative material having dot-free white backgrounds and highlights, eliminating the time-consuming work presently involved in producing such printing plates.

Other objects and advantages will be readily apparent from the following description.

In the drawings:

Figure 1 is a plan view of the art sheet;

Figure 2 is a view taken along the line 2—2 of Figure 1;

Figure 3 is a plan view of a modified art sheet;

Figure 4 is a view taken along the line 4—4 of Figure 3; and

Figure 5 is a fragmentary perspective view of this modification.

The sheet 10 is formed of a suitable transparent or translucent material, such as various types and forms of plastic well-known to those skilled in the art. Disposed on at least one face of the transparent or translucent sheet are symmetrically positioned cups 12. The cups 12 are circular, gradually decreasing in diameter from their uppermost extreme to a centrally disposed well 14 at the bottom thereof in the embodiment of Figures 1 and 2.

In use, ink is brushed, rolled, or otherwise applied, across the sheet 10 with the ink accumulating in the cups. The amount of ink which accumulates in each cup can be controlled by the viscosity thereof, the surface tension thereof, the interfacial surface conditions between the ink and the material of sheet 10, as well as the shape of cups 12 and the amount of ink applied. The amount of ink in the cups varies the size of the dots produced upon the negative and/or the printing plate. Upon first application, the ink will settle into the lower levels of the cups. Further applications of ink will fill the cups to progressively greater depths and consequently greater widths at the upper surface of the ink, forming progressively larger screen-dots. When the application of ink has completely filled the cups, the peaks or spaces between the cups may be left uncovered, or by further application of ink, may be covered so as to present a solid unscreened appearance when light is transmitted through the uninked areas of the sheet or halftone art copy. Thus, the sheet 10 may be positioned over a line drawing and ink deposited in the cups in amounts to create the desired tone values in areas which coincide with the line drawing. A negative is exposed to light through sheet 10, with the result that the dots formed by the ink in the cups are reproduced thereon since the light will not pass through the ink. A metal printing plate is then produced from the negative, by any of the standard methods well-known to those skilled in the art. By varying amounts of ink in the cups, a halftone pattern, similar, in effect, to standard halftone dot structures, is produced on the negative. Thus, a much simpler and more accurate reproduction can be made, reducing greatly the camera time, and often eliminating all need for the halftone camera.

Where it is desired to print an illustration combining halftone and type, or halftone and pen lines, the type and line work may be produced on a translucent supplementary sheet, such as plastic film or tracing paper, which is superimposed in register upon sheet 10. In this manner, the whole illustration may be assembled and previewed prior to exposure of the negative.

Similarly, where color printing is involved, different colored inks may be applied to separate sheets, also providing a preview of the completed illustration and vastly simplifying the production of multicolor printing plates, since simple contact prints eliminate the necessity for color separation negatives made through a halftone screen, in a process camera.

In the embodiment of Figures 3, 4 and 5, the cups 16 have a square cross-section instead of circular which is a preferable configuration for etching the metal printing plate. The cups are formed by molding, pressing or stamping from a master die, for example, of four converging planes forming four-sided truncated pyramids both above and below the datum plane of the sheet 10 shown in broken lines in Fig. 4, those below being designated cups 16 and those above being designated mounds 18. Between the cups and adjacent to them are mounds 18 preferably positioned in checkerboard fashion so that the cups and mounds alternate in planar, vertical, horizontal and diagonal directions. The top edges of the cups 16, therefore, coincide with the bottom edges of the mounds 18 at the datum plane. The cups 16 may be filled with ink to selected levels, forming dots, until the level of the datum plane is reached, whereupon the ink forms a continuously connected area surrounding the mounds 18. While this arrangement of sheet 10 is preferred, the sheet may be formed with any relief configuration that will reticulate a fluid mass by gravitational flow and/or the several forces that control flow of a fluid in contact with a solid into a dotted or linear pattern from which a halftone reproduction may be made.

While what hereinbefore has been described is the preferred embodiment of this invention, it is readily apparent that alterations and modifications may be resorted to without departing from the scope of this invention, and such alterations and modifications are intended to be included within the scope of the appended claims.

I claim:

1. A process for producing screened negatives from which printing plates are made comprising: applying ink to selected depths over symmetrically disposed separated cups depressed below a datum plane in a sheet adapted to pass light and mounds above said datum plane in checkerboard fashion, the top edges of the cups coinciding with the bottom edges of the mounds at the datum plane, so that the ink in the cups forms separated dots, and, when the datum plane is reached, the ink forms a continuously connected area surrounding the mounds, to form a desired pattern, and exposing a negative to a light source with said cups interposed between the negative and the light.

2. A process for producing screened negatives from which printing plates are made comprising: applying ink to selected depths over symmetrically disposed separated cups in the form of inverted pyramids depressed below a datum plane in a sheet adapted to pass light and upright pyramids above said datum plane in checkerboard fashion, the top edges of the inverted pyramids coinciding with the bottom edges of the upright pyramids at the datum plane, so that the ink in the inverted pyramids forms separated dots, and, when the datum plane is reached, the ink forms a continuously connected area surrounding the upright pyramids, with a well at the bottom thereof to form a desired pattern, and exposing a negative to a light source with said cups interposed between the negative and the light source.

3. A process for producing a range of tone values in screened halftone art copy comprising: applying ink to selected depths to a translucent sheet containing a plurality of small separated cups depressed below a datum plane and mounds above said datum plane, in checkerboard fashion, the top edges of the cups coinciding with the bottom edges of the mounds at the datum plane, so that the ink in the cups forms separated dots, and, when the datum plane is reached, the ink forms a continuously connected area surrounding the mounds, for accumulating such ink which settles into the lower levels of such cups to form small screen-dots, and further applying such ink filling the cups in preselected areas to progressively greater depths and greater widths to form progressively larger screen-dots.

4. A process for producing a range of tone values in screened halftone art copy comprising: applying ink to selected depths to a translucent sheet containing a plurality of small separated cups depressed below a datum plane and mounds above said datum plane in checkerboard fashion, the top edges of the cups coinciding with the bottom edges of the mounds at the datum plane, so that the ink in the cups forms separated dots, and, when the datum plane is reached, the ink forms a continuously connected area surrounding the mounds, for accumulating such ink which settles into the lower levels of such cups to form small screen-dots, further applying such ink filling the cups in preselected areas to progressively greater depths and greater widths to form progressively larger screen-dots, and further applying ink to bring the level in said cups to the upper limit thereof.

5. A process for producing a range of tone values in screened halftone art copy comprising: applying ink to selected depths to a translucent sheet containing a plurality of small separated cups depressed below a datum plane and mounds above said datum plane in checkerboard fashion, the top edges of the cups coinciding with the bottom edges of the mounds at the datum plane, so that the ink in the cups forms separated dots, and, when the datum plane is reached, the ink forms a continuously connected area surrounding the mounds, for accumulating such ink which settles into the lower levels of such cups to form small screen-dots, further applying such ink filling the cups in preselected areas to progressively greater depths and greater widths to form progressively larger screen-dots, further applying ink to bring the level in said cups to the upper limit thereof, and further applying ink to cover the area between said cups to present a solid unscreened appearance.

References Cited in the file of this patent

UNITED STATES PATENTS 1,849,036    Ernst _____ Mar. 8, 1932

FOREIGN PATENTS 7,572    Great Britain _____ Mar. 31, 1914